United States Patent
Xia et al.

(10) Patent No.: US 6,703,443 B2
(45) Date of Patent: Mar. 9, 2004

(54) LOW-VISCOSITY NONAQUEOUS LIQUID PIGMENT DISPERSIONS AND METHODS OF UTILIZING SUCH COMPOSITIONS

(75) Inventors: Jusong Xia, Spartanburg, SC (US); Mark E. Ragsdale, Duncan, SC (US); Eric B. Stephens, Roebuck, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 10/243,040

(22) Filed: Sep. 13, 2002

(65) Prior Publication Data

US 2003/0139526 A1 Jul. 24, 2003

Related U.S. Application Data

(62) Division of application No. 09/586,391, filed on Jun. 2, 2000.

(51) Int. Cl.$^7$ .................. C08L 75/02; C08G 18/08; C08G 18/81
(52) U.S. Cl. .................. 524/589; 524/590; 521/130; 521/137; 521/155; 528/44; 528/45; 528/48; 528/79; 516/32; 516/33; 252/182.23; 106/436; 106/472
(58) Field of Search ............ 106/410, 413, 106/436, 437, 447, 472, 476, 477; 516/32, 33; 252/182.23; 521/130, 131, 134, 137, 155, 170; 524/589, 590; 528/44, 45, 48, 79, 85

(56) References Cited

U.S. PATENT DOCUMENTS

| | | | |
|---|---|---|---|
| 3,883,466 A | 5/1975 | Olstowski | 260/32.2 |
| 3,886,466 A | 5/1975 | Wheatley, Jr. | 330/15 |
| 4,709,002 A | 11/1987 | Younes | 528/53 |
| 4,731,427 A | 3/1988 | Younes | 528/53 |
| 5,028,635 A | 7/1991 | Nodelman | 521/130 |
| 5,112,877 A | 5/1992 | Barker et al. | 521/110 |
| 5,116,903 A | 5/1992 | Gebregiorgis | 524/589 |
| 5,149,458 A | 9/1992 | Nodelman | 252/182.26 |
| 5,442,034 A | 8/1995 | Primeaux, II | 528/60 |
| 6,294,590 B1 * | 9/2001 | Ragsdale et al. | 521/130 |
| 6,541,532 B1 * | 4/2003 | Ragsdale et al. | 521/130 |

FOREIGN PATENT DOCUMENTS

| | | |
|---|---|---|
| EP | 0 276 452 | 12/1987 |
| EP | 0 350 644 | 6/1989 |

* cited by examiner

Primary Examiner—Joseph D. Anthony
(74) Attorney, Agent, or Firm—Terry T. Moyer; William S. Parks

(57) ABSTRACT

A new and useful nonaqueous liquid pigment dispersion is provided which is easy to handle and produces thorough and effective colorations within target media, particularly as compared to standard solid pigments or high-viscosity liquid pigment dispersions. More specifically, the present invention relates to liquid pigment dispersions possessing viscosities of at most 5,000 centipoise at standard temperature and pressure. Such a low viscosity is obtained through the addition of relatively low amounts of aprotic viscosity modifiers possessing dipole moments of at between about 1.0 and 5.0, alternatively measured in terms of a flash point between about −20° C. and 180°, such as, most preferably cyclic carbonates. The resultant low-viscosity pigment compositions thus can be incorporated into any standard pigment-coloring method (such as, for example, polyurethane, polyolefin, and the like) without the problems associated with traditionally utilized solid or thickened, high viscosity pigment materials. The method of coloring such target media is also encompassed within this invention.

8 Claims, 3 Drawing Sheets

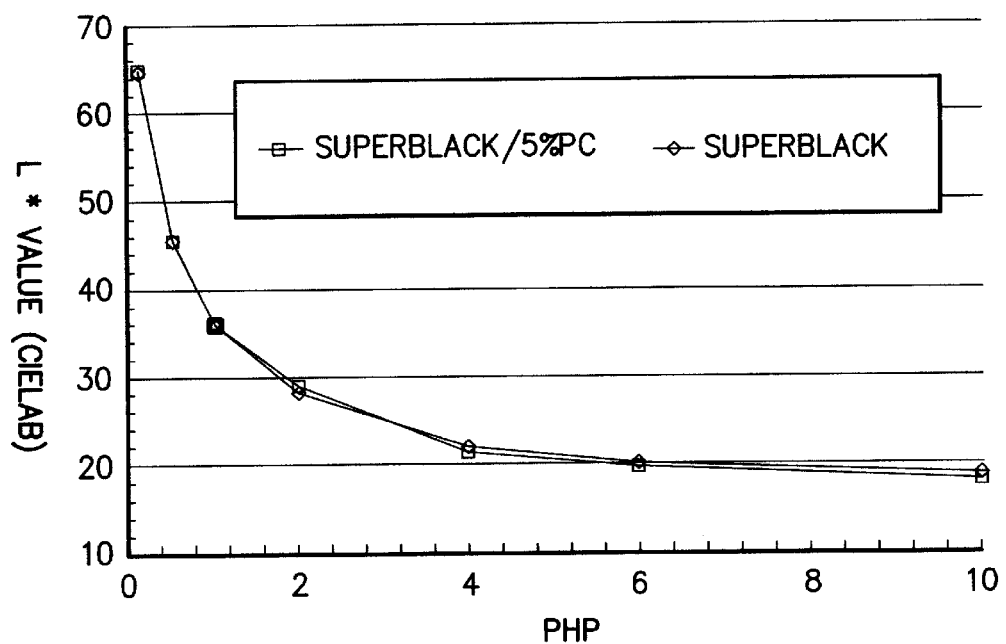
FIG. -1-

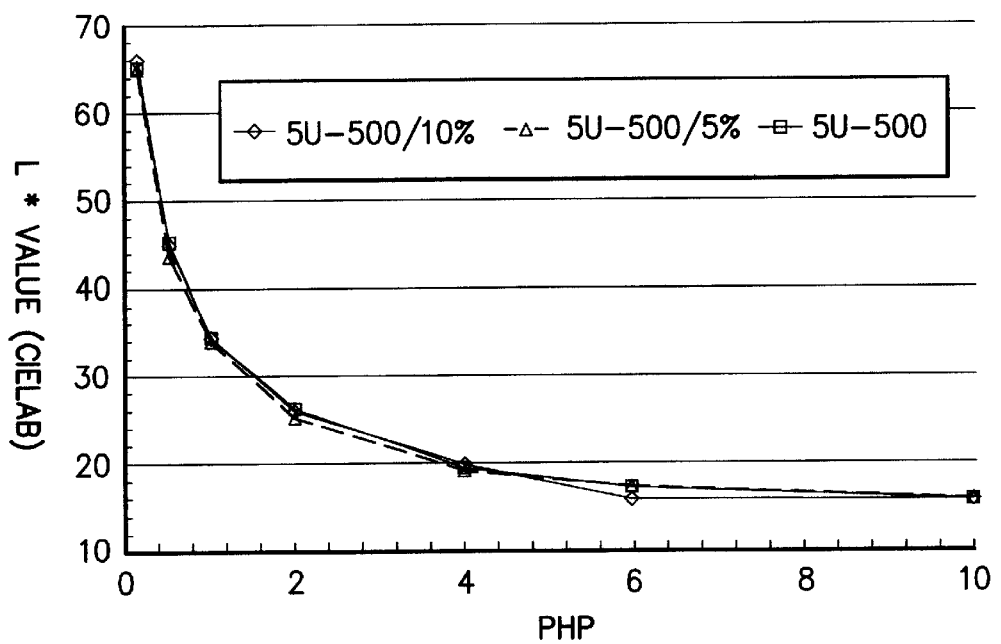
FIG. -2-

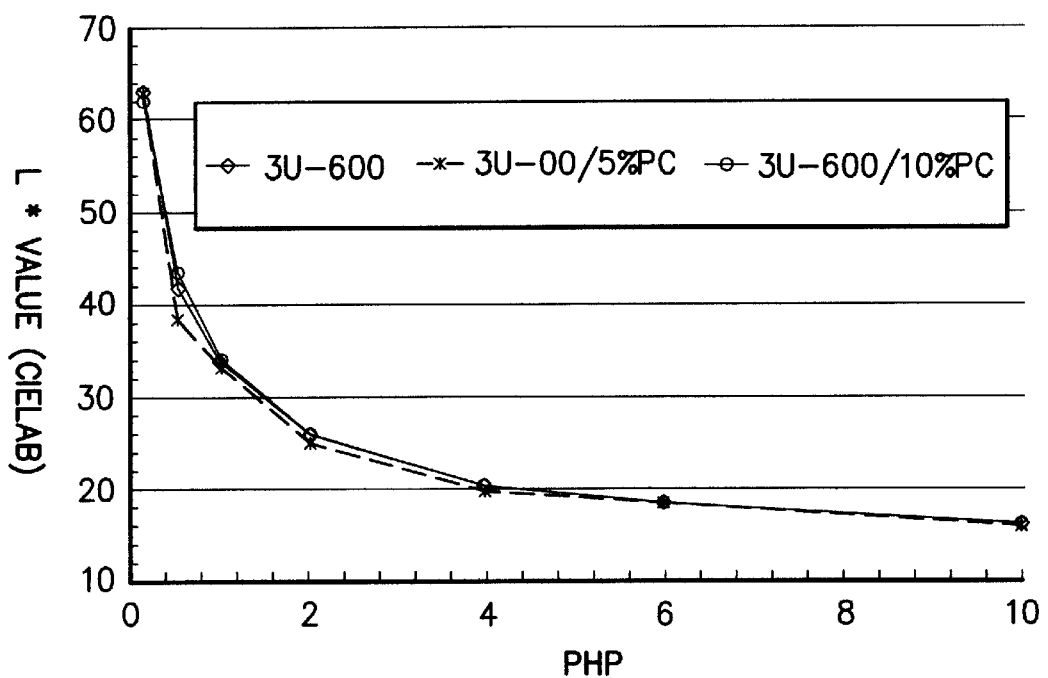
FIG. —3—

LOW-VISCOSITY NONAQUEOUS LIQUID PIGMENT DISPERSIONS AND METHODS OF UTILIZING SUCH COMPOSITIONS

CROSS REFERENCE TO RELATED APPLICATIONS

This application is a divisional of application Ser. No. 09/586,391, filed on Jun. 2, 2000 now allowed.

FIELD OF THE INVENTION

This invention relates to new and useful nonaqueous liquid pigment dispersions which are easy to handle and produce thorough and effective colorations within target media, particularly as compared to standard solid pigments or high-viscosity liquid pigment dispersions. More specifically, the present invention relates to liquid pigment dispersions possessing viscosities of at most 5,000 centipoise at standard temperature and pressure. Such a low viscosity is obtained through the addition of relatively low amounts of aprotic viscosity modifiers possessing dipole moments of between about 1.0 and 5.0, or, alternatively, a flash point of between about −20° C. and 180° C., such as, most preferably, cyclic carbonates. The resultant low-viscosity pigment compositions thus can be incorporated into any standard coloring method utilizing pigments (such as, for example, for polyurethanes, polyolefins, and the like) without the problems associated with traditionally utilized solid or thickened, high viscosity pigment materials. The method of coloring such target media is also encompassed within this invention.

BACKGROUND OF THE PRIOR ART

Polyurethane products, such as foams, resins, and the like, have traditionally been colored by pigments, polymeric colorants, and dyes. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition, in the presence of a catalyst possibly, to form the desired colored foam. Pigments have also been added in the past, most notably in solid, paste, or powder form, to a polyol stream to form the same type of colored foam products. Such compounds are readily available and inexpensive; however, they also exhibit or create problems during handling, mixing (with other pigments to create different shades, for example), and actual incorporation within target media. Furthermore, pigments, being solid in nature, tend to from clumps of solids within target media that leads to aesthetically displeasing consequences or clogging of machinery or instrumentation (such as pumps, valves, injectors, and the like). Additionally, spills are likely (since the powder or solid form of such pigments do not transport easily due to atmospheric conditions and possible air disturbances), and clothes or hand staining by difficult-to-handle pigment compounds is very likely to occur through the utilization of such solid coloring agents. As such, there is a need to improve upon these handling deficiencies of standard solid and powder pigments compounds. Polymeric colorants, being liquid in nature, have proven easier to use in such processes due to facilitation of handling, particularly at industrial levels. Low viscosity dispersions of pigments with low color availability have been developed within this industry as an attempt to alleviate such handling problems (and thus permit utilization of polymeric colorant-like liquid compositions). However, such low viscosity dispersions are not storage stable and have precipitation problems that produce uneven colorations within the final polyurethane product and thus make such dispersions unsuitable for large-scale industrial use as well. Traditionally, a trade-off has been present with pigments: the higher the viscosity of the pigment solution, the better the storage stability; the lower the viscosity, the worse the storage stability. As such, there is a recognized need to provide an improved pigment dispersion that possesses long-term storage stability as well as good colorability of the target polyurethane composition. Furthermore, such dispersions should exhibit the shade general degree of color depth within the target article substrate as a standard pigment provides. To date, there have existed no such needed advancements in this art.

OBJECTS OF THE INVENTION

It is therefore an object of this invention to provide a substantially uniform, low viscosity liquid pigment dispersion for ease of handling in large industrial applications. A further object is to provide a liquid pigment dispersion for utilization within a colored foam production process. A further objective of this invention is to provide a storage-stable pigment dispersion that retains the same general color value as the non-dispersed pigment.

SUMMARY OF THE INVENTION

Accordingly, this invention is directed to a nonaqueous liquid dispersion comprising at least one pigment and at least one aprotic viscosity modifying compound exhibiting a dipole moment of between about 1.0 and 5.0 or alternatively, a flash point of between about −20° C. and 180° C. Also encompassed within this invention is a method of producing a colored polyurethane comprising the steps of (a) providing a polyol composition;

(b) introducing a nonaqueous liquid dispersion comprising at least one pigment and at least one aprotic viscosity modifying compound exhibiting a dipole moment of at least 1.0. into said polyol composition to form a colored polyol composition; and (c) mixing said colored polyol composition with an isocyanate to form a polyurethane.

The term "nonaqueous" denotes a composition into which no water has been specifically introduced. Due to the possibility of atmospheric water being introduced through exposure to a relatively humid environment, this term does not rule out the potential for any water to be present through such a manner. The term "liquid dispersion" is intended to encompass any composition which is present in a fluid state (i.e., possessing a viscosity of below about 10,000 centipoise at standard temperature and pressure). The term "aprotic" is well known within the chemical arts and simply means that no protons can be accepted or donated by the specific compound. As such, it is imperative that certain moieties not be present on the intended viscosity modifying compound. Such unwanted moieties include, without limitation, acid groups, hydroxyls, amines, and the like. However, as noted above, this list is not definitive; any aprotic compound possessing the required dipole moment or flash point is included in this definition.

The dipole moment requirement for the viscosity modifying compound is necessary to provide the desired performance characteristics for the inventive nonaqueous pigment-containing dispersion. It has been found, surprisingly, that the selection of a relatively low dipole moment viscosity modifying compound provides the desired drastic lowering of overall viscosity while simultaneously separating individual pigment particles within solution, and preventing reagglomeration of the same particles. Furthermore, due to the low dipole moment, the corresponding flash point of the viscosity modifying compound is also relatively low in order to permit removal of such a compound upon introduction within a coloring method utilizing relatively low processing temperatures, if desired. Alternatively, such compounds may also react within the target media as well. As such, since the aprotic compound must exhibit a low flash point, and dipole moments have not been recorded for all compounds which may function in this capacity within the inventive dispersions, the viscosity modifying compound may alternatively be defined in relation to its aprotic nature and its flash point. Thus, a flash point of between about −20° C. and 180° C. is necessary; preferably such a level is between 0° C. and 165° C.; more preferably from 80° C. to about 160° C.; most preferably between about 95° C. and 145° C. Such an aprotic compound thus does not affect any production methods (such as, as merely one example, polyurethane coloring through initial introduction within a polyol composition followed by admixing with an isocyanate; at low heat exposures, the viscosity modifying compound will evaporate from the final composition with relative ease). It is also preferable that the selected aprotic viscosity modifying compound (or compounds) be liquid in nature and exhibit a viscosity of at most 500 centipoise at standard temperature and pressure (i.e., 25° C. at 1 atmosphere) as measured by a Brookfield Viscometer. This requirement facilitates handling (particularly in large-scale industrial applications) and more easily permits production of the desired viscosity level for the nonaqueous liquid pigment dispersion itself.

Also determined to be of great importance to the selection of a proper viscosity modifying compound within the inventive nonaqueous liquid pigment dispersion is the molecular weight of such a compound. Due to the low dipole moment (which concerns the low polarity of the compound itself), and/or the low flash point necessary for such a compound, the molecular weight must also be rather low. Thus, a molecular weight of at most 200 is available for the inventive dispersion; preferably, this weight is at most 150; more preferably, at most about 120; and most preferably, between about 85 and 116.

Such an inventive dispersion is preferably storage stable. By this term, it is intended that the inventive dispersion will remain in a fluid state with substantially no precipitation or reagglomeration of pigment for at least 60 days while being continuously exposed to a temperature of at least 50° C. Such a test is one manner of reproducing long-term storage conditions and thus is not intended as being the sole limitation of temperature within this invention. One of ordinary skill in this art would appreciate the need to provide a modified test of this nature. Thus, the inventive dispersions must merely exhibit substantially no precipitation and retention of its fluid state (low viscosity) after exposure to high temperature storage for 60 days.

As noted above, the problems associated with pigments on an industrial scale are remedied through the utilization of low viscosity dispersions. Most mechanisms required to incorporate pigments or pigments dispersions within target media (for example, mixheads and/or feed tank pipes for adding pigments within polyurethane foam production methods utilize certain pumps and feed lines that are highly sensitive to pressure provided by high viscosity pigment formulations. With lower and possibly more uniform viscosities between utilized pigment compositions, versatility of colors increases, thereby providing an overall improved ability to produce desirable end products. Such low viscosity may be (and has been) provided through the introduction of a solvent or viscosity modifier at a point in time near to the actual incorporation of the dispersion within the target media (for polyurethane, the addition would take place either within the polyol component or within the isocyanate component; the two components are mixed together with catalysts to form the desired polyurethane foam). However, this late introduction adds to the complexity and potential problems facing the user in producing such dispersions, again, and particularly, at the industrial level. Thus, a storage stable, low viscosity pigment dispersion is highly desired; unfortunately, such dispersions have not been available until this recent development.

The inventive liquid dispersions exhibit a number of surprising characteristics that lend themselves to a suitable inexpensive, yet highly effective coloring formulation, particularly for polyurethanes. Storage stability, without any appreciable precipitation of the pigments from solution, is of utmost importance with such dispersions. The retention of extremely low viscosities, without any noticeable precipitation, over a long duration, thus provides a highly desired, easy-to-handle product. Without intending to be bound to any scientific theory, it is believed that such storage stability is provided through the interaction of the specifically selected aprotic viscosity modifiers with the target pigment particles while in dispersion. Such modifiers appear to reduce the size of any agglomerated pigment particles (from larger clumps to smaller particles), possibly through hydrogen bonding, initially, and subsequently prevent re-agglomeration by apparently surrounding the target small particles. Even upon heat exposure and centrifugation, the viscosity of the inventive dispersion does not appreciably change. Additionally, the polyurethane foams produced with such inventive dispersions do not exhibit any appreciable losses in color or shade depth in comparison with standard non-modified pigment dispersions. Other impressive similarities between such viscosity modified and non-viscosity modified pigment dispersions are discussed in greater detail below. Succinctly, the inventive dispersions provide improved processability over non-modified pigment dispersions, as well as simultaneous storage stability, all without any appreciable loss in performance as compared with the same non-modified pigment dispersions. Such highly unexpected benefits are of enormous importance to improving upon the available process conditions for applications requiring pigment and/or pigment dispersion utilization.

The viscosity modifiers utilized within this invention must thus be able to actually lower the viscosity of the target pigment dispersions, be able to provide retention of such low viscosities upon long-term storage, must not deleteriously affect the coloring ability of the pigments within the target media, most preferably polyurethane, and must be easily removable from the target media or composition utilized to produce or color such target media at a selected time, or, again, must react within such a target media or media-producing or -coloring composition. The above-discussed ability of the viscosity modifiers to reduce and retain small pigment particle size in the dispersion actually appears to provide more effective colorations throughout the target media. Again, without intending to be limited to one specific scientific explanation or theory, it is believed that by reducing particle size in a stable formulation allows for a more even coloring due to the greater uniformity of pigment size and distribution within the target composition or article. Furthermore, the desired viscosity modifiers of the inventive dispersions must not deleteriously affect the actual target media itself. Preferably, the low dipole moment (and thus low flash point) compounds can be easily evaporated from the target media (such as polyurethane) or the composition utilized to produce such target media, or may react within the target media. Alternatively, if evaporation is not followed (since, for example, heat exposure may deleteriously effect the media itself), the selected compounds would actually be capable of reacting within the target media and enhancing, rather than harming, the characteristics of the target media upon introduction within the pigment dispersion.

With all this in mind, it has been found that certain cyclic compounds, namely and preferably carbonates and lactones, provide the necessary characteristics of the inventive pigment dispersion and exhibit the required low dipole moments. Preferably such viscosity modifiers are alkylene carbonates or butyrolactone; most preferably the modifier is selected from propylene carbonate, butyrolactone, and mixtures thereof. Other modifiers which may be present include DMSO (dimethylsulfoxide), valerolactones (both gamma and sigma types), 1,3-dioxolane, caprolactone, tetrahydrofuran, and the like. The extremely low flash points of 1,3-dioxolane and tetrahydrofuran make them less appealing candidates for selection within this invention; however, their viscosity reducing abilities may be utilized in low temperature processes to produce the desired nonaqueous liquid pigment dispersions. The viscosity modifier (or modifiers) may be present in any amount that provides any reduction in viscosity of the target pigment dispersion. Thus, any amount from about 0.01 to about 25% by weight of the total dispersion is possible; preferably, this amount is from about 1 to about 15% by weight; more preferably from about 5 to about 10% by weight.

The use of cyclic carbonates and cyclic lactones in polyurethane chemistry is known. U.S. Pat. No. 3,883,466 describes the use of a cyclic alkylene carbonate as a liquid modifier to moderate the reaction exotherm between the hydroxy component and the polyisocyanate in the production of a rigid, dense rapid-setting polyurethane. U.S. Pat. Nos. 4,709,002 and 4,731,427 describe the use of cyclic alkylene carbonates in the production of rigid RIM polyisocyanurate and urethane-modified polyisocyanurate parts. These two references do not indicate why cyclic alkylene carbonate is used but do suggest that the carbonate can be added to the isocyanate stream in order to reduce its viscosity. U.S. Pat. Nos. 5,028,635 and 5,149,458 report two polyurea-cyclic carbonate RIM systems having improved flow properties. European Patent 0,350,644 and U.S. Pat. No. 5,442,034 report similar applications for cyclic carbonate in RIM elastomers and spray polyurea elastomers, respectively. U.S. Pat. No. 4,812,523 describes high solids thermosetting coating composition with cyclic carbonates as reactive diluents to reduce viscosity. Cyclic carbonates and cyclic lactones have also been used as viscosity reducing agents in aromatic polyester polyols and polyether polyols (EP 0,276,452). No teachings or fair suggestions exist, however, that cover the incorporation, addition, etc., of such viscosity reducing agents to already liquid pigment dispersions to improve the desired coloring procedures.

Any standard pigment may be utilized within this inventive dispersion. Thus, carbon black, lamp black, titanium dioxide, phthalocyanine, and the like, may be present. Preferably, the pigment exhibits an individual particle size of between about 13 and 75 nanometers (in order to effectuate a reduction to and retention of the lowest possible agglomerate size). More preferably, then the pigment is a carbon black with a particle size of below about 30 nanometers. The preferred pigment may also be admixed with the viscosity modifier as a solution itself; the only requirement is that the overall viscosity of such a pigment solution be reduced upon introduction of the desired modifier. Most preferred are the following specific pigments: Super Black 34-81107 (from Ferro), Black 34-88111 (from Ferro), Ester Black 33-88033 (from Ferro), Carbon Black 1106 (from Rebus), Black 2101 (from Rebus), High Strength Black 2125 (from Rebus), Polyton Black UE-3012 (from Dainippon Ink & Chemicals, Inc.), Union Black 5U-500 (from Union Chemical Ind., Ltd. of Taiwan), Union Black 3U-600, Ester Black ES100 (from PEKA), Pigment Black (from Dong Ryung of South Korea), Lung Black (from Kuang of Taiwan), Green 1750 (from Rebus), and Blue, Green, and Black Pigment Dispersions from Ryvec. Certain pigments exhibit proper viscosity reductions when admixed with certain viscosity modifiers noted within the low dipole moment class of compounds discussed previously. However, not every low dipole moment compound will produce the same type or level of viscosity modification as desired. For instance, some of the listed viscosity modifiers actually increase the pigment dispersion viscosity and thus are not proper selections on a commercial level. However, these compounds are still effective for other types of pigments and thus are included within the class of modifiers as listed above. The proper selection for commercial practice of certain viscosity modifiers in tandem with certain pigment dispersions is a relatively simple procedure. In order to produce a commercially viable inventive nonaqueous liquid pigment dispersions, one of ordinary skill in the art must analyze a physical mixture of the desired pigment and the low dipole moment viscosity modifying compound(s); if the viscosity does not decrease upon the introduction of 15% by weight of the modifier (in comparison with the total weight of the pigment), then the dispersion should not be utilized at the commercial level. Again, this limit on commercial activity solely pertains to that limited area; the inventive dispersions are not limited in scope due to that selection criteria.

Although the inventive dispersions may comprise a formulation of solely pigment (or mixtures of pigments) and viscosity modifier, other constituents may also be present. Such components include, without limitation, solvents, such as water, lower alcohols, methyl ethyl ketone, and the like; other types of colorants, including dyes, polymeric colorants, inks, and the like; hydrotropes; salts; pH modifiers; and surfactants.

BRIEF DESCRIPTION OF THE DRAWINGS

FIGS. 1, 2 and 3 represent build curves for the inventive and comparative liquid pigment dispersions pertaining to the color values available versus the diluted amounts of pigment present within the pertinent compositions thereof.

DESCRIPTION OF THE PREFERRED EMBODIMENT

For the following examples, the particularly analyzed, and thus potentially preferred aprotic viscosity modifying compounds (as well as some comparative compounds) were:

VISCOSITY MODIFIERS TESTED

| Modifier | Dipole Moment | Flash Point (° C.) | Mol. Weight |
|---|---|---|---|
| Propylene Carbonate (PC) | 4.9 | 135 | 102 |
| Butylene Carbonate (BC) | * | 135 | 116 |
| Ethylene Carbonate (EC) | 4.87 | 160 | 88 |
| Butyrolactone (BLO) | 4.27 | 98 | 86 |
| Caprolactone (CLO) | 4.35 | 109 | 114 |
| 1,3-Dioxolane (DOL) | 1.19 | 1 | 74 |
| Tetrahydrofuran (THF) | 1.75 | −17 | 72 |
| Dimethylsulfoxide (DMSO) | 3.96 | 95 | 78 |
| Ethylene Glycol (EG) | 2.28 | 110 | 62 |
| Propylene Glycol (PG) | * | 107 | 76 |

*The Dipole Moments of these compounds have not been determined.

Thus, these compounds were introduced within the following non-limiting, but preferred and comparative examples, and analyzed and tested for various desired characteristics. Except as specifically noted, the viscosity measurements were run on a Brookfield Viscometer at 25° C. with a spindle of 6 rpm.

A. Viscosity Behavior of Various Inventive and Comparative Pigment Dispersions

1. Ferro Super Black 34-81107

| Additive | Standard | 1% | 3% | 5% | 10% | 15% |
|---|---|---|---|---|---|---|
| PC | 6,966 | 5,533 | 4,320 | 3,133 | 2,241 | — |
| BLO | 6,966 | 5,600 | 3,970 | 2,800 | 1,530 | 800 |
| EC | 6,966 | 5,700 | 4,520 | 4,550 | 6,350 | 25,320 |
| EG | 6,966 | 6,408 | 7,145 | 7,384 | 8,777 | 11,146 |

Thus, propylene carbonate and butyrolactone were found to be excellent viscosity modifiers for this particular specialized pigment dispersion. Ethylene carbonate is a semi-solid and does not work for this particular pigment. Ethylene glycol, however, free hydroxyl groups, is not a good viscosity modifier at all.

2. Ferro Black 34-88111

Viscosity Measurements (cps) for 0, 3, 5, 10, and 15% additions by weight of modifier:

| Additive | Standard | 3% | 5% | 10% | 15% |
|---|---|---|---|---|---|
| PC | 25,050 | 21,800 | 16,850 | 12,550 | 7,550 |

This particular pigment (not present within a low viscosity dispersion) is conventional, and propylene carbonate provided excellent viscosity modifications at each level.

3. Ferro Ester Black 33-88033

Viscosity Measurements (cps) for 0, 1, 3, 5, 10, and 15% additions by weight of modifier.

| Additive | Standard | 1% | 3% | 5% | 10% | 15% |
|---|---|---|---|---|---|---|
| PC | 3,000 | 2,900 | 2,640 | 2,120 | 1,880 | 1,220 |

Again, propylene carbonate provided excellent viscosity modifications.

4. Rebus Carbon Black 1106

Viscosity Measurements (cps) for 0, 1, 2, 3, 5, 10, and 15% by weight additions of modifier:

| Additive | Standard | 1% | 2% | 3% | 5% | 10% | 15% |
|---|---|---|---|---|---|---|---|
| PC | 11,200 | 9,250 | 9,000 | 8,400 | 7,700 | 5,350 | 3,750 |
| EG | 11,200 | 11,146 | 10,905 | 10,664 | 9,110 | 4,233 | 2,518 |

At lower concentrations, PC is a much more effective viscosity modifier than EG.

5. Rebus Black 2101

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 11,900 | 11,350 | 9,800 | 8,400 | 5,400 | 2,200 |

Propylene carbonate is an excellent viscosity modifier for this specific pigment dispersion.

6. Rebus High Strength Black 2125

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 84,100 | 38,600 | 29,400 | 16,130 | 9,100 | 7,200 |
| BLO | 84,100 | 63,660 | 42,800 | 16,740 | 15,500 | 8,690 |
| CLO | 84,100 | 69,800 | 49,450 | 40,460 | 15,600 | 8,590 |
| DOL | 84,100 | 78,600 | 73,200 | 39,800 | 17,840 | 4,150 |

For this specific pigment (not in a liquid dispersion intially), all of these provided excellent viscosity modifying characteristics.

7. Polyton Black UE-3012

Viscosity Measurements (cps) for 0, 1, 2, 3, 5, 10, and 15% by weight additions of modifier:

| Additive | Standard | 1% | 2% | 3% | 5% | 10% | 15% |
|---|---|---|---|---|---|---|---|
| PC | 11,100 | 10,700 | 9,950 | 9,050 | 7,525 | 5,625 | 4,150 |
| BLO | 11,100 | 10,100 | — | 8,300 | 6,887 | 4,125 | 2,475 |
| EG | 11,100 | 9,592 | 9,131 | 9,801 | 8,712 | 8,503 | 8,691 |

Propylene carbonate and butyrolactone are much more effective viscosity modifiers than ethylene glycol for this specific pigment dispersion.

8. Union Black 5U-500

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 6,700 | 6,180 | 5,950 | 4,600 | 3,200 | 2,180 |
| BLO | 6,700 | 5,980 | 4,750 | 3,970 | 2,350 | 1,450 |
| CLO | 6,700 | 6,080 | 5,160 | 4,650 | 3,030 | 2,070 |
| DOL | 6,700 | 5,690 | 4,040 | 3,070 | 1,470 | 810 |
| DMSO | 6,700 | 6,060 | 4,940 | 4,110 | 2,770 | 1,620 |
| EG | 6,700 | 6,650 | 6,020 | 5,820 | 5,030 | 6,120 |

This pigment is initially present as a paste and is made from about 25–40% carbon black, 75–60% polyether polyol and a small amount of other additives. The cyclic compounds such as propylene carbonate, butyrolactone, and caprolactone are excellent modifiers for this specific pigment. 1,3-Dioxolane and DMSO are good modifiers of viscosity. Ethylene glycol is by far the least effective at viscosity reduction of the group. 9. Union Black 3U-600

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 8,280 | 7,690 | 6,070 | 4,870 | 3,070 | 1,940 |
| BLO | 8,280 | 7,260 | 5,870 | 4,580 | 2,860 | 1,501 |
| DOL | 8,280 | 6,590 | 5,090 | 3,630 | 1,590 | 810 |
| EG | 8,280 | 8,010 | 7,470 | 7,130 | 7,290 | 7,220 |
| PG | 8,280 | 8,70 | 7,220 | 6,590 | 4,500 | 3,520 |
| THF | 8,280 | 6,910 | 4,740 | 3,400 | 1,460 | 650 |

Again, the cyclic compounds, 1,3-dioxolane, and tetrahydrofuran are good viscosity modifiers for this pigment. The glycols are poor selections for this purpose.

10. PEKA Ether Black VP6000

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 3,110 | 3,000 | 2,560 | 2,130 | 1,250 | 750 |
| BLO | 3,110 | 2,830 | 2,530 | 2,170 | 1,320 | 640 |

Again, the cyclic modifiers were excellent for the reduction of viscosity for this pigment.

11. PEKA Ester Black ES 100

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 7,600 | 6,240 | 5,820 | 5,340 | 2,260 | 390 |

Propylene carbonate proved to be extremely effective for viscosity reduction of this pigment.

12. Dong Ryung Pigment Black

Viscosity Measurements (cps, 2.5 rpm, 25° C.) for 0, 1, 3, 5, 10, and 15% by weight additions of modifier:

| Additive | Standard | 1% | 3% | 5% | 10% | 15% |
|---|---|---|---|---|---|---|
| PC | 17,440 | 16,540 | 12,300 | 12,120 | 6,340 | 4,020 |
| BLO | 17,440 | 16,191 | 10,491 | 9,810 | 7,175 | 5,336 |

The cyclic compounds again proved to reduce the viscosity of Dong Ryung Pigment Black dispersion effectively.

13. Kuang Lung Black (from Taiwan)

Viscosity Measurements (cps, 1 rpm, 25° C.) for 0, 1, 3, 5, 10, and 15% by weight additions of modifier:

| Additive | Standard | 1% | 3% | 5% | 10% | 15% |
|---|---|---|---|---|---|---|
| BLO | 39,350 | 30,450 | 27,200 | 22,550 | 16,700 | 11,000 |

Butyrolactone provided excellent reduction of this thick paste pigment.

14. Rebus Green 1750

Viscosity Measurements (cps) for 0, 1, 3, 5, 10, and 15% by weight additions of modifier:

| Additive | Standard | 1% | 3% | 5% | 10% | 15% |
|---|---|---|---|---|---|---|
| PC | 6,216 | 5,566 | 4,966 | 4,035 | 2,750 | 1,875 |
| BLO | 6,216 | 5,541 | 4,625 | 3,565 | 2,891 | 1,686 |

Again, the cyclic propylene carbonate and butyrolactone provided excellent viscosity modification for this specific pigment.

15. Ryvec Pigment Dispersions (COMPARATIVES)

a) Ryvec Blue—

Viscosity Measurements (cps, 25° C., 2.5 rpm) for 0, 1, 2, 5, and 10% by weight additions of modifier:

| Additive | Standard | 1% | 2% | 5% | 10% |
|---|---|---|---|---|---|
| PC | 18,000 | 17,600 | 16,220 | 15,440 | 12,040 | b) Ryvec Green—

Viscosity Measurements (cps) for 0, 1, and 3% by weight additions of modifier:

| Additive | Standard | 1% | 3% |
|---|---|---|---|
| PC | 975 | 1,080 | 1,066 | c) Ryvec Black—

Viscosity Measurements (cps, 25° C., 100 rpm) for 0, 1, 3, and 5% by weight additions of modifier:

| Additive | Standard | 1% | 3% | 5% |
|---|---|---|---|---|
| PC | 337 | 382 | 404 | 422 |

Ryvec pigment dispersions are made from pigments, fatty alcohols or fatty esters, and naphthenic oils and are not physically stable upon settling. Viscosity modifiers do not work in these dispersion systems.

B. Physical Stability of Inventive and Comparative Dispersions

1. Centrifugation Test (A)—Viscosity Comparison Procedures Followed—
   a) 50 g samples of inventive dispersions (Pigment/5% PC blend; 47.5 g pigment dispersion with 2.5 g Propylene Carbonate) were made as well as 50 g samples of pigment alone.
   b) The samples were then tested for physical stability by centrifugation:
      i) The initial viscosity of each sample was first measured by Brookfield Viscometer.
      ii) Centrifuge tubes were then filled separately to about ½ full with inventive and comparative dispersions.
      iii) The tubes were then capped and placed within the centrifuge with the tubes balanced on opposite sides of the centrifuge.
      iv) The centrifuge was then run for 15 minutes at 1300 rpm.

v) The resultant samples were then observed for separation of color from the liquid.

vi) The viscosity of each centrifuged sample was then measured.

Samples Tested—

The following samples were used for testing:

a) Ferro Super Black 34-81107
b) Super Black/5%PC
c) Union Black 5U-500
d) 5U-500/5%PC
e) 5U-500/10%PC
f) 3U-600/5%PC
g) 3U-600/10%PC Results and Conclusions—

In addition to visual observations, the initial and centrifuged viscosities of the samples were measured. No significant visual changes or viscosity differences were noticed. The data (25° C., 6 rpm) are as follows:

| Sample | Initial Visc. (cps) | Visc. after Centrifugation (cps) |
|---|---|---|
| Ferro Super Black 34-81107 | 6,980 | 7,020 |
| Super Black/5% PC | 3,230 | 3,280 |
| Union 5U-500 | 6,560 | 6,480 |
| Union 5U-500/5% PC | 4,220 | 4,210 |
| Union 5U-500/10% PC | 2,760 | 2,770 |
| Union 3U-600/5% PC | 4,920 | 4,870 |
| Union 3U-600/10% PC | 3,080 | 3,075 |

Thus, all of the above inventive and comparative dispersions were physically stable upon centrifugation test in term of viscosity, showing no deleterious effects due to reduction of viscosity utilizing the above-noted viscosity modifiers.

2. Centrifugation Test (B)—Foam Performance Comparison

Procedures—

The same centrifuged samples were utilized to test foam performance in order to verify the physical stability of samples after centrifugation:

1 g of each sample was carefully removed from the top of each of the centrifuged samples and mixed [in a 1 part per hundred (php) amount of toluene diisocyanate] to produce a polyurethane foam for each sample. These foams were then compared with 1 php foams of regular uncentrifuged dispersions. The depth of shade of each sample was compared with its centrifuged counterpart for any changes (by Hunter Color Instrument #00550, in relation to changes in lightness and darkness, ΔL)

Samples Tested—

The following samples were used for testing:

a) Ferro Super Black 34-81107
b) Super Black 34-81107/5%PC
c) Union Black 5U-500
d) 5U-500/5%PC
e) 5U-500/10%PC
f) 3U-600/5%PC
g) 3U-600/10%PC Results and Discussion—

The legend for this table is: un=uncentrifuged; cent=centrifuged; ΔL* is the change in lightness (+) or darkness (−) from the uncentrifuged sample to the centrifuged sample; pass/fail concerns the acceptability of the particular L* for each specific sample.

| Sample | Foam Strength | ΔL | Pass/Fail |
|---|---|---|---|
| Super Black (un) | 1 php | 0 | pass |
| Super Black (cent) | 1 php | ~0 | pass |
| Super Black/5% PC (un) | 1 php | 0 | pass |
| Super Black/5% PC (cent) | 1 php | ~0 | pass |
| 5U-500 (un) | 1 php | 0 | pass |
| 5U-500 (cent) | 1 php | 1.19 | pass |
| 5U-500/5% PC (un) | 1 php | 0 | pass |
| 5U-500/5% PC (cent) | 1 php | 0.53 | pass |
| 5U-500/10% PC (un) | 1 php | 0 | pass |
| 5U-500/10% PC (cent) | 1 php | −0.17 | pass |
| 3U-600/5% PC (un) | 1 php | 0 | pass |
| 3U-600/5% PC (cent) | 1 php | −0.84 | pass |
| 3U-600/10% PC (un) | 1 php | 0 | pass |
| 3U-600/10% PC (cent) | 1 php | 1.13 | marginal |

The shade matching reading from Hunter Color Instrument #00550 gave a "pass" or "marginal pass" to all of the above uncentrifuged and centrifuged sample sets evincing the same physical stability results as above.

3. Thermostability Test (C)—50° C. Oven Test

Procedures— a) 50 g samples of an inventive dispersion [50 g of Super Black/5% PC blend (47.5 g Super Black, and 2.5 g Propylene Carbonate), for example] and a comparative dispersion (50 g of Super Black alone, again, as one example) were produced and placed in separate 4 ounce jars.

b) Thermo-Phase stability test:
  i) The initial viscosities of the samples were first measured.
  ii) The samples were then tightly capped and place in a 50° C. oven; the potential phase separation and viscosity of each sample was tested every two days.

Samples Tested—

The following samples were tested in a 50° C. oven:

a) Ferro Super Black 34-81107
b) Super Black 34-81107/5%PC
c) Union Black 5U-500
d) 5U-500/5%PC
e) 5U-500/10%PC Results and Discussion—

Some small changes were noticed for each sample over a sustained duration. The results (cps, 4 rpm, 25° C.) were as follows:

Super Black 344-81107/5%PC:

| Initial | 2 days | 4 days | 8 days | 10 days | 14 days | 16 days | 21 days |
|---|---|---|---|---|---|---|---|
| 3,025 | 3,100 | 3,125 | 3,350 | 3,350 | 3,800 | 3,770 | 3,750 |

Union Black 5U-500 and its PC blends:

| Sample | Initial | 2 days | 5 days | 7 days | 9 days | 12 days | 14 days |
|---|---|---|---|---|---|---|---|
| 5U-500 | 6,800 | 6,860 | 7,000 | 7,200 | 7,160 | 7,300 | 7,450 |
| 5U-500/5% PC | 4,470 | 4,560 | 4,660 | 4,700 | 4,770 | 4,800 | 4,970 |
| 5U-500/10% PC | 2,770 | 3,040 | 3,080 | 3,120 | 3,160 | 3,250 | 3,280 |

Over the period of 2–3 weeks at 50° C., some viscosity increases were observed for both standard CB dispersion and its PC blends, but these changes were insubstantial. The addition of PC as a viscosity modifier within such pigment dispersions did not cause a meaningful difference in terms of thermostability.

4. Heating/gelation Test (D)—
Procedure—

In order to investigate whether the addition of PC causes gelation problems within pigment dispersions, the following procedure and test were performed (utilizing a Brookfield Programmable DV–II+ Viscometer):
  a) 9 g of a sample (an inventive dispersion and its comparable non-viscosity modified dispersion) were placed within a viscometer cup, and set upon the viscometer.
  b) The temperature was adjusted to a control of about 60° C.
  c) The motor was started and the speed was adjusted to its maximum torque.
  d) The viscosity for each sample was then read at 60 minute intervals over 24 hours.

Samples Tested—
The following dispersions were tested:
  a) Ferro Super Black 34-81107
  b) Union Black 5U-500
  c) 5U-500/5%PC
  d) 3U-600
  e) 3U-600/5%PC
  f) 3U-600/10%PC Results and Discussion—
The selected viscosity readings (cps, 60° C., 6 rpm) are summarized as the following:

| Sample | 1 h | 4 h | 8 h | 12 h | 16 h | 20 h | 24 h |
|---|---|---|---|---|---|---|---|
| Super Black | 1,364 | 1,346 | 1,233 | 1,189 | 1,170 | 1,168 | 1,158 |
| 5U-500 | 1,116 | 1,118 | 1,119 | 1,128 | 1,140 | 1,152 | 1,158 |
| 5U-500/5% PC | 901 | 907 | 916 | 920 | 931 | 935 | 940 |
| 3U-600 | 1,269 | 1,303 | 1,333 | 1,351 | 1,380 | 1,407 | 1,423 |
| 3U-600/5% PC | 863 | 878 | 897 | 907 | 920 | 921 | 940 |
| 3U-600/10% PC | 527 | 529 | 541 | 545 | 550 | 556 | 562 |

Except for Super Black, slight viscosity increases were noticed for all of the samples tested. The addition of PC into the standard pigment dispersions did not evince any appreciable adverse viscosity behavior differences upon heating to 60° C.

5. Freeze-thaw Test (E)—
Procedure—

The following procedure was followed to perform this Freeze-thaw test in a –13° C. freezer:
  a) 200 g samples of inventive and comparative dispersions were prepared in 4-oz jars and tightly capped after their initial viscosities were measured.
  b) The capped samples were then placed into a –13° C. freezer for 15 h; after that period, the samples were warmed to room temperature for 9 hours; then the samples were subjected to a total of three such freeze/thaw cycles.
  c) The samples were then measured for resultant viscosities and compared with the initial readings.

Samples Tested—
The following 8 samples were tested:
  a) Union 5U-500
  b) 5U-500/5%PC
  c) 5U-500/10%PC
  d) 3U-600
  e) 3U-600/5%PC
  f) 3U-600/10%PC
  g) Super Black 34-81107
  h) Super Black 34-81107/5%PC Results and Discussion—
The results are summarized as the following:

| Sample | Initial Visc. | Final Visc. |
|---|---|---|
| 5U-500 | 6,980 cps | 6,450 cps |
| 5U-500/5% PC | 4,210 | 4,141 |
| 5U-500/10% PC | 2,760 | 2,730 |
| 3U-600/5% PC | 4,920 | 4,870 |
| 3U-600/10% PC | 3,080 | 3,075 |
| Super Black | 6,770 | 6,650 |
| Super Black/5% PC | 3,100 | 3,040 |

The above data suggest that the inventive dispersions are at least as stable as standard pigment dispersions at –13° C. The addition of PC does not destabilize the standard pigment dispersions at freezing temperatures.

6. Long-term Storage Stability Test (F)—

The following samples were stored at room temperature for a long, specified duration. Every four days about 5 g from the top portions of the samples were taken from each separate bottle and measured for viscosity. The results over a course of two months are as follows:

| Sample | 0 day | 11 days | 21 days | 31 days | 47 days | 56 days | 62 days |
|---|---|---|---|---|---|---|---|
| Super B/5% PC | 3,090 | 3,090 | 3,020 | 3,030 | 3,100 | 3,140 | — |
| 5U-500 | 6,490 | 6,490 | 6,540 | 6,520 | 6,210 | 6,350 | 6,310 |
| 5U-500/5% PC | 4,220 | 4,130 | 4,260 | 4,180 | 3,990 | 3,960 | 3,980 |
| 5U-500/10% PC | 2,760 | 2,850 | 2,900 | 2,720 | 2,420 | 2,430 | 2,640 |

As the results suggest, the addition of PC does not affect the stability of standard pigment dispersions.

C. Reactivity of Preferred Low Dipole Moment Cyclic Carbonate Viscosity Modifiers in During Polyurethane Foam Formation Procedures—
The following procedures were followed to perform this test:
  a) 10 php black polyether foams were produced by introducing either an inventive dispersion or a standard pigment dispersion. The resultant foams were stored at room temperature for one week.
  b) 2 g of each respective foam were then cut from the samples above, placed within 100 ml of MeOH at 50°

C. oven for 1 hour, and then at room temperature for 18 hours (to test for extraction).

c) After removal of the foams, 10 mL aliquots of the MeOH solutions were then analyzed for PC presence by GC-MS in comparison with a pure 10 mL PC standard.

Samples Tested—

3 Black PE foams by using the following samples as coloration reagents at 10 php levels:
 a) Union Black 3U-600
 b) 3U-600/5%PC
 c) 3U-600/10%PC Results and Discussion—

No propylene carbonate (PC) was detected in any of the above methanol extractions.

D. Build Curves for Colored Foams

Procedure—

In order to compare the relative strength of standard carbon black dispersions with their respective inventive low viscosity blends, various standard polyurethane ethyl foams (1.5 pdf density) were made at 0.1, 0.5, 1.0, 2.0, 4.0, 6.0 and 10.0 php levels, by using the following samples:
 a) Ferro Super Black 34-81107
 b) Super Black 34-81107/5%PC
 c) Union Black 5U-500
 d) 5U-500/5%PC
 e) 5U-500/10%PC
 f) Union Black 3U-600
 g) 3U-600/5%PC
 h) 3U-600/10%PC The coloration depth of the foams were analyzed by a Hunter Color Instrument to determine appropriate L* values at such different color loadings. The L* values (represent the coloration depth) were used to plot the build curves which are represented in FIGS. 1, 2, and 3. As can easily be seen, the coloration depth provided by the low viscosity compositions are essentially the same as for the unmodified base pigments or pigments dispersions. Such a result is extremely surprising as this connotes that the "diluted" pigments retain substantially the same color values as the high viscosity (and thus, theoretically stronger color) couterparts. These build curves thus represent the most important discovery with this invention, in that no loss of color strength is created upon viscosity reduction with utilization of the very favorable low dipole moment or specific low flash point viscosity modifying agents within pigment compositions.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

What is claimed is:

1. A method of producing a colored polyurethane comprising the steps of
   (a) providing a polyol composition;
   (b) introducing a nonaqueous liquid dispersion comprising at least one pigment and at least one aprotic viscosity modifying compound exhibiting a dipole moment of between about 1.0 and 5.0 or, alternatively, exhibiting a flash point of between about −20° C. and 180° C. into said polyol composition to form a colored polyol composition; and
   (c) mixing said colored polyol composition with an isocyanate to form a polyurethane.

2. The method of claim 1 wherein said at least one aprotic viscosity modifying compound is a liquid possessing a viscosity of at most 500 centipoise at standard temperature and pressure, and wherein said viscosity modifying compound does not possess any constituent hydroxyl, amine, or acid groups.

3. The method of claim 1 wherein said at least one aprotic viscosity modifying compound possesses an average molecular weight of at most 300.

4. The method of claim 1 wherein the viscosity of said dispersion is at most 5,000 centipoise at standard temperature and pressure.

5. The method of claim 1, wherein said at least one viscosity modifier is selected from the group consisting of at least one cyclic carbonate, at least one dioxolane, and any mixtures thereof.

6. The method of claim 5 wherein said at least one viscosity modifier is selected from the group consisting of at least one cyclic carbonate.

7. The method of claim 6 wherein said at least one viscosity modifying compound is propylene carbonate.

8. A method of producing a colored polyurethane comprising the steps of
   (a) providing a polyol composition;
   (b) introducing a nonaqueous liquid dispersion comprising at least one carbon black pigment and at least one aprotic viscosity modifying compound exhibiting a dipole moment of between about 1.0 and 5.0 or, alternatively, exhibiting a flash point of between about −20° C. and 180° C. into said polyol composition to form a colored polyol composition; and
   (c) mixing said colored polyol composition with an isocyanate to form a polyurethane.

* * * * *